United States Patent Office 2,766,291
Patented Oct. 9, 1956

2,766,291

METAL SALTS OF ALKYL PHENOL SULFIDES

Jesse S. Weissberg, Elizabeth, N. J., and John R. Jones, Seattle, Wash., assignors to Esso Research and Engineering Company, a corporation of Delaware No Drawing. Application July 9, 1952,
Serial No. 297,978

6 Claims. (Cl. 260—609)

This invention relates to improved metal salts of alkyl phenol sulfides and more particularly to an improved process for making them. It also relates to the use of these compounds as additives for petroleum products and the like.

It is well known in the art to employ metal phenates, metal thiophenates and metal salts of phenol and thiophenol sulfides and their sulfurized derivatives as additives for lubricating oils and the like. These materials improve various properties of internal combustion engine lubricants, particularly from the standpoint of detergency properties to promote engine cleanliness. Materials having a relatively high metal content generally exert a greater detergency action than those having lower metal contents. The so-called "basic" metal derivatives of phenolic-type compounds, in which the compound is treated with an excess of a basic metal agent, are superior in this respect.

The conventional procedure for forming the basic salts requires a considerable excess of neutralization agent. Much of the agent is not utilized in forming the metal derivative and is therefore wasted. It is a primary purpose of the present invention to provide a process for producing such basic metal salts especially salts of the phenol sulfides in which a greater utilization of neutralization agent is achieved. In addition, the resulting product contains a third component not utilized in prior art process which results in the production of an improved composition of matter.

In accordance with the present invention, an alkyl phenol sulfide is treated with an excess amount of a neutralizing agent in the presence of a minor amount of a polyhydroxy organic compound such as a low molecular weight polyhydric alcohol having in the range of 2 to 7 carbon atoms. It has been found that the resulting product contains a higher content of metal than does the product produced in the absence of the polyhydroxy organic compound when using the same amounts of neutralizing agent in both cases. Obviously, less neutralization agent is needed to obtain a product having a given metal content when the polyhydroxy compound is present. The chemistry of the reactions involved when employing the polyhydroxy compound is quite obscure. It is not desired to be bound by any particular theory or hypothesis as to what occurs during the reaction; however, the polyhydroxy compound may have a solubilizing effect on the alkyl phenol sulfide making neutralization of the hydroxyl somewhat easier. On the other hand, the polyhydroxy organic compound may react to some extent with the basic metal neutralizing agent to form a metal derivative thereof or to form a complex salt with the alkyl phenol sulfide. It is possible also that a combination of these phenomena and others not well understood may occur during the reaction.

The basic metal salt of the alkyl phenol sulfide is prepared in accordance with conventional procedures except that the polyhydroxy organic compound is present during the neutralization step. The alkyl phenol sulfide is first mixed with at least 5% by weight, preferably about 10 to 30% by weight, based on the phenolic compound, of the polyhydroxy organic compound. A divalent metal basic reacting agent is then added to the mixture in a quantity greater than that required to form the normal salt of the alkyl phenol sulfide, the reaction generally being conducted at an elevated temperature such as in the range of about 90° to 230° C. The reaction may be carried out by dissolving the materials in a suitable solvent, such as a mineral base oil, before adding the basic material. Generally the basic neutralization agent is used in an amount at least 20%, preferably about 50 to 200%, in excess of that required for neutralization. The polyhydroxy organic compound or at least a residue thereof remains in the finished product. It is interesting to note that this procedure is not very satisfactory with phenates; it is applicable mainly to phenol sulfides.

The polyhydroxy compounds may have in the range of 2 to 7 carbon atoms, although compounds having 2 to 5 carbon atoms are preferred since they have a high ratio of hydroxyl radicals to carbon. These compounds are preferably polyhydroxy aliphatic alcohols although compounds containing ether linkages between carbon atoms, such as polyhydroxy ether alcohols, may be used with excellent results. Typical polyhydroxy compounds include ethylene glycol; propylene glycol; isopropyl ethylene glycol; 1,2-butanediol; 1,4-butanediol; glycerol; erythritol; erythrol; pentaerythritol; diethylene glycol ($\beta,\beta'$-dihydroxyethylether); dipropylene glycol and triethylene glycol. The hexitols and their partially dehydrated derivatives, such as sorbitan, etc., have some utility also.

The alkyl phenol sulfides used to prepare the metal salts of the present invention have the characterizing structure

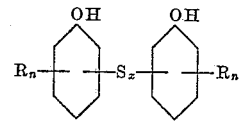

in which R is an alkyl group containing at least 4, preferably 5 to 20, carbon atoms, $n$ and $x$ are integers from 1 to 4. It is to be understood that when more than one R group is attached to a given aromatic nucleus, such groups may be alike or different. Illustrative examples of groups represented by R are the following: n-amyl, isoamyl, n-octyl, isooctyl, tert.-octyl, nonyl, dodecyl, octadecyl and wax chain radicals.

It should be understood that generally, throughout this specification and the appended claims, the term "alkyl phenol sulfide" or "alkylated phenol sulfide" is meant to include not only the monosulfides but also the di- and poly-sulfides and polymers of alkyl phenol sulfides as well. The polymers of alkyl phenol sulfides may be represented structurally by the formula

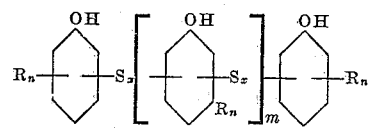

where R, $n$, and $x$ have the meanings given above and where $m$ is a small whole number not greater than about six. Although the reaction of an alkylated phenol with sulfur dichloride ($SCl_2$) will give essentially an alkyl phenol monosulfide, small amounts of polysulfides and of polymeric materials of the above type will also be formed. This is even more usually the result when more than the theoretically required proportion of sulfur halide is used in preparing the alkyl phenol sulfide, as for example, when two mols of alkyl phenol sulfide are treated with 1.5 mols of sulfur dichloride. Similarly, the alkyl phenols may be treated with more than theoretical quantities of sulfur monochloride ($S_2Cl_2$) or with mixtures of sulfur mono- and dichlorides or with first one halide and then the other.

The alkyl phenol sulfide may then be treated with the basic metal neutralizing agent to form metal alkyl phenol sulfides. This reaction will be carried out in the presence of the polyhydroxy compound by the procedure described heretofore. The metal alkyl phenol sulfides in themselves are very useful as additives although it is generally preferred to treat them with additional quantities of sulfur or a sulfide of phosphorus or the like at an elevated temperature to obtain derivatives of higher sulfur and/or of phosphorus content having useful properties.

The divalent metal neutralizing agents useful in the practice of the present invention may be in the form of a metal oxide, hydroxide, sulfide, alkoxide, hydride, or carbide of calcium, barium, strontium, magnesium, zinc, and the like. The alkaline earth metal compounds are particularly preferred, and of these the barium compounds are most useful. Thus, barium salts of alkyl phenol sulfides are readily prepared by reacting the sulfide with barium hydroxide, preferably in the form of a hydrate. The calcium salts may be prepared by reacting alkyl phenol sulfide with calcium methylate or other calcium alkylate. As known in the prior art, mixed bases may be used to prepare mixed salts. In some cases, not all of the metallic base which has been added for the purpose of forming a pure basic salt will react with the alkyl phenol sulfides. However, substantial quantities of metal base, above that required to form the normal salt, will usually react. In general, a substantially larger portion of the metal base will react in the presence of the polyhydroxy compound than will react under conventional conditions. The final product therefore may consist of a mixture of the normal salt and the basic salt. It is to be understood that the invention includes such materials as well as the basic salts.

When carrying out the preparation of the salts in the presence of a mineral oil or other viscous solvents, good results are obtained when using a minor proportion of a high molecular weight monohydroxy alcohol such as stearyl, lauryl, or cetyl alcohol and other alcohols having 8 or more carbon atoms. These higher alcohols act as solvents for the final products. Usually a 3 to 15% concentration of the alcohol, based on the material being treated, will prevent foaming. It is emphasized however that the higher monohydroxy alcohols used as anti-foaming agents in no way affect the results obtained with the polyhydroxy compounds. The monohydroxy alcohols do not affect the metal content of the final product, and there is no known evidence that these compounds enter into or otherwise affect the reaction between metal base and alkyl phenol sulfide product in any manner.

The preparation of basic metal alkyl phenol sulfides, and the sulfurized derivatives of these compounds is well known to the prior art. Such art includes U. S. Patents 2,409,686, 2,451,346, and 2,518,379, all issued in the name of Dilworth T. Rogers and John G. McNab.

Generally, the additives of the present invention are most advantageously blended with lubricating oil base stocks in concentrations between the approximate limits of 0.02% and 10.0% and preferably from 0.1% to 5.0%, although larger amounts may be used for some purposes. The exact amount of addition agent required for maximum improvement depends to a certain extent on the particular products used, the nature of the lubricating oil base stock and the general operating conditions of the engine in which the lubricant is to be employed. This same general range of concentration will also be effective when the additives are to be used in greases and in extreme pressure lubricants, although in the latter instance greater amounts may also be employed.

It is often convenient to prepare concentrates of the additives in oil, containing about 25 to 75% of active ingredient, the concentrate later being added to a suitable lubricating oil base stock to give a finished blend containing the desired percentage of additive. This, when using a 40% concentrate, 2.5% of this material may be blended with a suitable base stock to give a finished oil containing 1% of effective addition agent.

The lubricating oil base stocks used in the compositions of this invention may be straight mineral lubricating oils or distillates derived from paraffinic, naphthenic, asphaltic or mixed base crudes, or if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloro ethyl ether, propane, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or voltolized products may be employed, either alone or in admixture with mineral oils.

For the best results the base stock chosen should normally be that oil which without the new additive present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. For this reason, non-sulfur bearing phenates are less satisfactory in the present process than the phenol sulfides. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed Diesel engines, the general practice has often been to use a lubricating oil base stock prepared from naphthenic or aromatic crudes and having a Saybolt viscosity at 210° F. of 45 to 90 seconds and a viscosity index of 0 to 50. However, in certain types of Diesel service, particularly with high speed Diesel engines, and in aviation engine and other gasoline engine service, oils of higher viscosity index are often preferred, for example, up to 75 to 100, or even higher, viscosity index.

In addition to the materials to be added according to the present invention, other agents may also be used such as dyes, pour depressors, heat thickened fatty oils, sulfurized fatty oils, organo metallic compounds, metallic or other soaps, sludge dispersers, anti-oxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds, and the like, may also be employed.

In addition to being employed in crankcase lubricants, the additives of the present invention may also be used in extreme pressure lubricants, engine flushing oils, industrial oils, general machinery oils, process oils, rust preventive compositions, and greases. Also their use in motor fuels, Diesel fuels and kerosene is contemplated. A particular application in this regard is their use in motor fuels containing tetraethyl lead or other anti-knock agents, the additives of the present invention serving not only as antioxidants for the fuel but also as stabilizers for the anti-knock agent itself. Since these additives exhibit antioxidant properties and are believed also to possess ability to modify surface activity, they may be employed in asphalts, road oils, waxes, fatty oils of animal or vegetable origin, soaps and plastics. Similarly, they may be used in any organic materials subject to deterioration by atmospheric oxygen.

In the following examples are described various preparations of products in accordance with this invention. It is to be understood that these examples, given for illustrative purposes only, are not to be construed as limiting the scope of the invention in any way.

EXAMPLE I.—PREPARATION OF PRODUCTS

*Product A.*—This product was an oil concentrate containing 50% by weight of an oil having an S. S. U. viscosity at 100° F. of about 165 and 50% by weight of tert.-octyl phenol sulfide. The product analyzed about 5.5% by weight of sulfur. The tert.-octyl phenol sulfide was prepared in the conventional manner by treating tert.-octyl phenol with sulfur chloride.

*Product B.*—428 g. of Product A, 164 g. of a Mid-Continent oil base stock having an S. S. U. viscosity at 100° F. of about 150, and 26 g. of "Lorol B" alcohol ($C_{10}$–$C_{18}$ monohydroxy alcohols added as an anti-foaming agent) were heated together to a temperature of about 120° C. 414 g. of barium hydroxide pentahydrate (equivalent to 4.32 mols $Ba(OH)_2$/mol phenol OH radical) were added slowly to the heated mixture. The resulting reaction was digested about one hour and filtered through "Hi-flo" diatomaceous filter aid at 150° C.

*Product C.*—428 g. of Product A, 121 g. of a Mid-Continent oil base stock having an S. S. U. viscosity at 100° F. of about 150, 26 g. of "Lorol B" alcohol, and 43 g. (20% by weight based on alkyl phenol sulfide) of diethylene glycol were treated with 414 g. of barium hydroxide pentahydrate by the identical procedure used in making Product B.

*Product D.*—This product was prepared by the procedure used for making Product C except that 43 g. of ethylene glycol was used in place of diethylene glycol. The mixture was treated with 500 g. of barium hydroxide octahydrate (equivalent to 4.32 mols $Ba(OH)_2$/mol phenol OH radical).

EXAMPLE II.—ANALYSIS OF PRODUCTS

The above products were analyzed for barium and sulfur contents. Results are shown in the table, below:

Table

| Product | B | C | D |
|---|---|---|---|
| Polyhydroxy alcohol used in preparation | No | Yes | Yes |
| Analysis, Weight Percent: | | | |
| Sulfur | 3.07 | 2.51 | 2.45 |
| Barium | 12.7 | 14.24 | 14.72 |
| Conversion, mol Barium/2 mols Phenol OH radical | 1.8 | 2.0 | 2.1 |

The use of a polyhydroxy alcohol in the preparation of the barium alkyl phenol sulfide effected a substantial increase in metal content of the product in comparison with the product prepared in the absence of polyhydroxy alcohol. A greater utilization of barium hydroxide was therefore obtained since the molar concentrations of neutralizing agent were constant in all preparations. A comparison of detergency, by measuring the dispersion of carbon black in mineral oils, and a comparison of corrosivity to metal bearings, etc., showed the product of the present invention to be highly satisfactory. The economy over conventional processes for imparting high alkalinity is a major factor. There is much less waste of barium hydroxide, for example, in the process of Example I, Products C and D, than in Product B.

What is claimed is:

1. In a process for the preparation of basic alkaline earth metal salts of alkyl phenol sulfides wherein the alkyl group contains from 5 to 20 carbon atoms in which an alkyl phenol sulfide is treated with an excess of an alkaline earth metal neutralizing agent to form said basic salt, the improvement which comprises conducting said treating step in the presence of at least 5% by weight, based on the weight of said phenol sulfide, of a glycol having from 2 to 7 carbon atoms.

2. A process according to claim 1 wherein said alkaline earth metal is barium.

3. A process according to claim 1 wherein said alkyl phenol sulfide is tert.-octyl phenol sulfide.

4. A process according to claim 1 wherein said glycol is diethylene glycol.

5. A process according to claim 1 wherein said glycol is ethylene glycol.

6. In a process for the preparation of basic barium salts of tert.-alkyl phenol sulfides wherein the alkyl group contains about 8 carbon atoms in which a tert.-octyl phenol sulfide is digested for about one hour with an excess of barium hydroxide pentahydrate in the presence of mineral oil as a diluent and a $C_{10}$ to $C_{18}$ monohydrate alcohol as an antifoamant, at a temperature of about 120° C., the improvement which comprises digesting said mixture in the presence of at least 5% by weight based on the weight of said tert.-octyl phenol sulfide of diethylene glycol.

References Cited in the file of this patent

UNITED STATES PATENTS

| 2,459,063 | Cook | Jan. 11, 1949 |
| 2,459,754 | Albert | Jan. 18, 1949 |
| 2,472,504 | Winning | June 7, 1949 |
| 2,488,134 | Mikeska et al. | Nov. 15, 1949 |
| 2,518,379 | Rogers | Aug. 8, 1950 |
| 2,695,898 | Lober et al. | Nov. 30, 1954 |